United States Patent [19]

Schubert

[11] 4,148,247
[45] Apr. 10, 1979

[54] DUAL POWER BRAKE BOOSTER
[75] Inventor: Malvin L. Schubert, Kettering, Ohio
[73] Assignee: General Motors Corporation, Detroit, Mich.
[21] Appl. No.: 801,848
[22] Filed: May 31, 1977
[51] Int. Cl.² .................. F15B 9/10; F15B 11/16; F15B 13/06
[52] U.S. Cl. .................... 91/49; 91/369 B; 91/370; 91/431; 91/510; 91/524
[58] Field of Search .......... 91/431, 369 B, 189 R, 91/372, 373, 189 A, 413, 49, 370

[56] References Cited
U.S. PATENT DOCUMENTS

| | | | |
|---|---|---|---|
| 3,026,852 | 3/1962 | Stelzer | 91/369 B |
| 3,813,992 | 6/1974 | Brown | 91/189 |
| 3,935,709 | 2/1976 | Mathues | 91/369 B |
| 4,007,664 | 2/1977 | Popp | 91/431 |

Primary Examiner—Paul E. Maslousky
Attorney, Agent, or Firm—D. D. McGraw

[57] ABSTRACT

A booster having a vacuum powered booster section and a hydraulic powered booster section which are normally actuated together to supply boosted force to a master cylinder. When the air valve of the vacuum booster section is operated to cause atmospheric air to enter the variable pressure chamber of the vacuum booster, it also engages and moves the hydraulic booster control valve to restrict hydraulic fluid flow therethrough, causing the hydraulic booster section control valve to be actuated to create a hydraulic pressure differential across the power wall of the hydraulic booster section. Both booster sections deliver boosted force through the output member of the hydraulic booster section to the master cylinder. Either booster section is operable when for any reason there is no power available for actuation of the other booster section. The hydraulic booster section has an integral reaction piston within its control valve, permitting simple reaction system changes depending upon the calibration required for each different vehicle. The hydraulic booster section control valve is almost completely balanced, lowering the force required to push the hydraulic control valve member to the hydraulic control valve seat.

2 Claims, 2 Drawing Figures

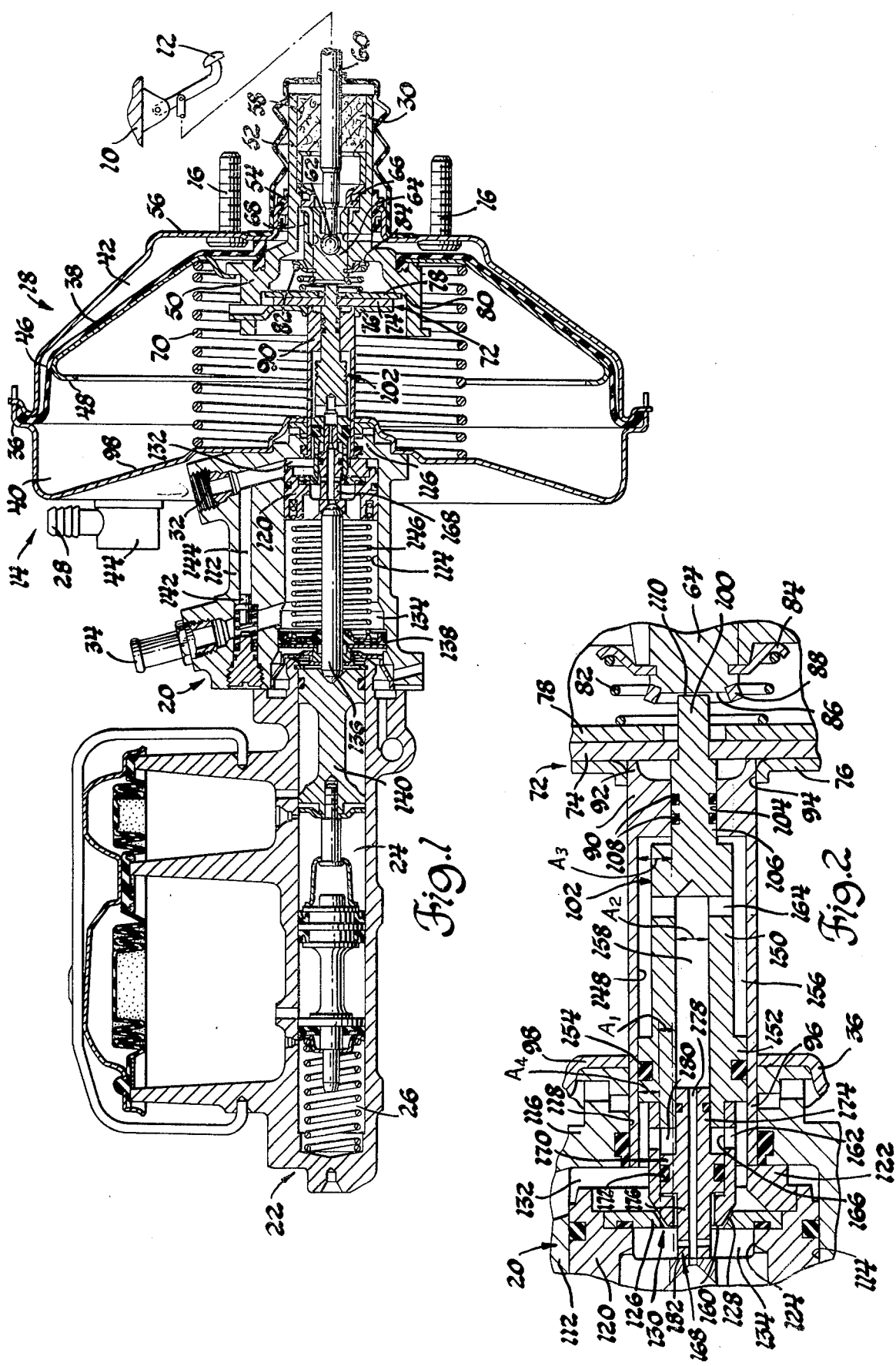

DUAL POWER BRAKE BOOSTER

The invention relates to a dual power brake booster and more particularly to one having a vacuum suspended booster section and a hydraulic pressure operated booster section, both sections normally being actuated substantially simultaneously to deliver a combined booster force to the master cylinder.

It is a feature of the invention to provide an integral reaction piston within the hydraulic booster control valve. Another feature is the provision of an almost completely balanced hydraulic booster section control valve. Such a substantially pressure balanced control valve lowers the force required to move the control valve into the valve seat since the back pressure in the hydraulic booster section acts only over a small differential area instead of over the entire control valve area. The booster embodying the invention has a single input member for the vacuum suspended booster section, a pair of parallel acting output members from the vacuum suspended booster section also providing a pair of parallel acting input members for the hydraulic booster section, and a single output member from the hydraulic booster section. The booster is a modification of the dual power brake booster of U.S. Pat. No. 3,935,709, issued Feb. 3, 1976 and entitled "Dual Power Brake Booster".

In The Drawing

FIG. 1 is a cross section view of a brake booster and master cylinder assembly embodying the invention.

FIG. 2 is a fragmentary cross section view of a portion of the booster of FIG. 1, showing the valve and reaction arrangement somewhat schematically.

A vehicle in which the brake booster and master cylinder assembly is installed is schematically represented in FIG. 1 by a support member 10 on which the brake pedal assembly 12 is pivotally mounted in the usual manner. A brake booster and master cylinder assembly 14 is provided with mounting studs 16 so as to be suitably mounted to a portion of the vehicle such as a vehicle fire wall. Assembly 14 includes a vacuum suspended booster section 18, a hydraulic booster section 20 and a master cylinder assembly 22. The master cylinder assembly is of the dual master cylinder type which has two pressurizing chambers 24 and 26 respectively connected to separate brake circuits of the vehicle.

The vacuum suspended booster section 18 is suitably connected to a source of vacuum such as the vehicle engine intake manifold through outlet 28 and to atmospheric air pressure through a filter 30. The hydraulic booster section 20 is connected to a source of hydraulic pressure such as the vehicle power steering pump at booster inlet port 32. The booster outlet port 34 is connected to the sump of the hydraulic pump. A suitable arrangement in the vehicle is illustrated and described in greater detail in the above noted U.S. Pat. No. 3,935,709.

The vacuum suspended booster section 18, which may be considered to be the first booster section, is a brake booster of the general type disclosed in U.S. Pat. No. 3,249,021, entitled "Power Brake Booster". It is essentially a single diaphragm, vacuum suspended booster having a lever reaction system. It has a housing 36 which has a movable power wall 38 received therein and dividing the housing into a substantially constant pressure chamber 40 and a variable pressure chamber 42. Vacuum is maintained in chamber 40 by check valve 44 and the usual operation of the vehicle engine when the vehicle engine intake manifold is the source of vacuum connected to port 28. The power wall 28 includes a diaphragm 46, a diaphragm support 48, and a piston 50 to which the diaphragm and its support are secured. Piston 50 has a rearward extension 52 which is slidable through a seal and bearing 54 provided in the rear section 56 of housing 36. Rearward extension 52 has a bore 58 therethrough in which air filter 30 is mounted. A push rod 60 is the input member of booster section 18 and is operatively connected to be axially moved by brake pedal 12 in the usual manner. Push rod 60 has a ball end 62 received in a pocket of the air valve 64. Valve 64 is considered to be a part of the input member of the booster section 18 and forms a part of the control valve mechanism for that booster section. Ball end 62 is staked in place to provide a pivotal connection between push rod 60 and air valve 64 but otherwise effectively joining them together as an input member. The air valve 64 is adapted for sliding movement through a portion of piston 50 and is arranged to meter the flow of atmospheric air to chamber 42. A floating valve 66 engages the wall of bore 58 and is suitably held in its operative position in relation to air valve 64 and the vacuum valve 68 formed as a part of power piston 50. Floating valve 56 is in engagement with air valve 64 when the booster section is in the released position illustrated. Floating valve 66 is slightly spaced from vacuum valve 68 when booster section 18 is in the released position illustrated so that vacuum is communicated from chamber 40 to chamber 42 through appropriate passages.

As is well known in the operation of this type of booster control mechanism, slight leftward movement of push rod 60 and air valve 64 permits floating valve 66 to engage vacuum valve 68 to close the vacuum connection between chambers 40 and 42. Further movement of air valve 64 causes the air valve to open relative to floating valve 66 and meter air at atmospheric pressure into chamber 42. This creates a pressure differential across power wall 38, moving the power wall leftwardly against the force of the power wall return spring 70. This also moves vacuum valve 68 and floating valve 66 leftwardly until the floating valve re-engages air valve 64. The booster is then in the poised position, holding this position since both the air valve and the vacuum valve are closed. Release of the brake pedal by the operator allows push rod 60 and air valve 64 to move rightwardly, lifting floating valve 66 off of vacuum valve 68, thereby reestablishing the vacuum connection between chambers 40 and 42 and decreasing the differential pressure across power wall 38 so that the power wall return spring 70 moves the power wall back to the release position shown in the drawing.

The lever reaction mechanism 72 of booster section 18 includes a lever reaction plate 74 engaged on one side by plate support member 76, reaction levers 78 disposed against one edge of the reaction lever plate and on the opposite side of the plate from support member 76, and a shoulder 80 on piston 50 with the outer ends of the reaction levers engaging the shoulder. The reaction mechanism further includes an air valve spring 82, one end of which engages the inner ends of levers 78 and the other end of which is seated on spring retainer 84, which is fastened to air valve 64. The forward face 86 of air valve 64 has a snubber 88 which engages the inner ends of levers 78 and then yields to permit engagement of these lever inner ends with the air valve face 86 when the booster is actuated. This reaction arrangement provides a sense of feel to the vehicle operator during operation of the power booster, as is well known in the brake booster art.

Booster section 18 differs substantially from the disclosure of U.S. Pat. No. 3,249,021 in the arrangement of the booster section output mechanism. The arrangement is generally similar to that of U.S. Pat. No. 3,935,709. The booster section output mechanism includes a first output member 90 formed as a sleeve. The rear end 92 of sleeve 90 is slidably received in an aperture 94 of plate support member 76 and abuts lever reaction plate 74. The forward end 96 of sleeve 90 extends through the forward section 98 of housing 36 in sliding and sealing relation. The second output member 100 is a part of a plunger 102 which also forms the substantially balanced valve member for the hydraulic booster section 20, as will be described. Sleeve 90 has a reduced diameter bore section 104 adjacent the sleeve rear end 92. Plunger 102 has a reduced diameter section 106 provided with seals 108 and extending through bore section 104 in sliding sealing relation. Output member 100 is a further reduced diameter section of plunger 102 which slidably extends through lever reaction plate 74, with the shoulder formed between sections 100 and 104 providing an abutment for plate 74. The end face 110 of output member 100 is positioned immediately adjacent air valve forward face 86 and in axial alignment therewith so that slight leftward movement of the air valve causes the air valve to engage output member 100 in force transmitting relation. The movement of the air valve required to engage output member 100 is preferably about the same movement required to permit floating valve 66 to initially engage vacuum valve 68.

The hydraulic booster section 20 includes a housing 112 having a bore 114 therein. The rear end of the bore has a rear wall 116 through which an opening 118 is provided. A power wall defined by a power piston 120 is reciprocably received in bore 114. An abutment 122 in the rearward side of piston 120 engages sleeve forward end 96 when the booster section is in the released position illustrated. Therefore the sleeve forward end 96 is an input member for the hydraulic booster section 20. The sleeve forward end 96 extends through opening 118 in sealing relation therewith. Piston 120 has a passage 124 extending therethrough and an annular valve seat 126 secured to the piston at the side of the piston passage 124 facing rear wall 116. The forward end of plunger 102 defines a control valve member valving surface 128 which cooperates with valve seat 126 to define the control valve 130 for the hydraulic booster section 20. This valve is of the open center type and therefore the valve elements 126 and 128 are spaced sufficiently apart axially to provide substantially unrestricted flow of hydraulic fluid through the valve so long as the hydraulic booster section is not actuated. The power piston 120 divides bore 114 into a power chamber 132, located between piston 120 and rear wall 116, and an exhaust chamber 134, located on the other side of piston 120. Passage 124 maintains communication between chambers 132 and 134 under the control of control valve 130. Thus exhaust chamber 134 is on the low pressure side of valve 130 and power chamber 132 is on the high pressure side, the hydraulic pressure inlet 32 being connected to continuously communicate with power chamber 132. A push rod 136 provides the final output member for booster sections 18 and 20. One end of rod 136 is engaged by piston 120 and the rod extends through chamber 134 and the end seal 138 forming the forward wall of that chamber. The forward end of push rod 136 is positioned to engage the primary pressurizing piston 140 of master cylinder assembly 22. The outlet port 34 of the hydraulic booster section 20 is in continuous communication with the forward end of exhaust chamber 134. A pressure relief valve 142 is provided in a passage 144 communicating inlet port 32 and outlet port 34. It provides a bypass arrangement and is normally closed. It is opened when pressure in the inlet port 32 exceeds a predetermined pressure required to open the valve, relieving excess input pressure. A power piston return spring 146 is positioned in chamber 134 and continuously urges the power piston to the release position shown.

The reduced diameter bore section 140 of sleeve 90 opens leftwardly into an enlarged bore section 148. The space between land 152 and the sleeve wall in which reduced diameter bore section 104 is formed is an annular chamber 156. A bore 158 is formed in plunger 102 and extends from the plunger forward end 160 to a point axially between land 152 and reduced diameter section 106. A first cross passage 162 is located between land 152 and the plunger forward end 160 so that it provides continuous communication between power chamber 32 and the portion of bore 158 which it intersects. Another cross passage 164 formed behind land 152 axially toward reduced diameter section 106 provides continuous communication between annular chamber 156 and the rear or rightward portion of bore 158. The forward portion of plunger 102 between the control valve member valving surface 128 and land 152 is externally fluted or otherwise formed for clearance so that cross passage 162 is at no time closed by the sleeve forward end 96.

Bore 158 has an enlarged section 166 in which a reaction piston 168 is mounted. Reaction piston 168 has a center land 170 provided with an external seal 172 for sealing reciprocal movement of the piston in bore section 166. A smaller diameter portion 174 of piston 168 extends rearwardly into the smaller diameter portion of bore 158. It is provided with a seal for sealing and reciprocal movement of the piston. Portion 174 may be considered to be a smaller diameter land. The smaller diameter portion 176 of reaction piston 168 extending forwardly of land 170 extends through the forward end of bore 158 and therefore also through the annular valving surface 128 and the forward end 160 of plunger 102. A bore 178 extends axially through reaction piston 168 so as to continually communicate exhaust chamber 134 with the portion of bore 158 through which cross passage 164 is drilled. Therefore annular chamber 156 is maintained at exhaust pressure found in chamber 134 at all times. The enlarged bore section 166 into which the first cross passage 162 opens provides, in cooperation with reaction piston land 170, a chamber 180 which is always at the pressure found in power chamber 132. The forward end 182 of reaction piston smaller diameter portion 172 abuts a portion of power piston 120.

When the assembly 14 is in the released position illustrated, hydraulic fluid is being circulated through the booster section 20, passing from inlet 32 to chamber 132, through the open control valve 130 to chamber 134, and out through port 34. Valve 130 is sufficiently open to provide no effective restriction to fluid flow and therefore no effective pressure buildup in chamber 132. The booster section 18 has vacuum in chambers 40 and 42, with the pressure being equalized on opposite sides of power wall 38. The power wall is therefore positioned rightwardly as shown.

When the brake pedal 12 is actuated by the operator to apply the vehicle brakes, push rod 60 and air valve 64 are moved leftwardly. Floating valve 66 engages vacuum valve 68 and the forward face 86 of air valve 64 engages the end face 110 of output member 100. Further movement of the brake pedal causes the air valve 64 to move away from floating valve 66, admitting metered air under atmospheric pressure to variable pressure chamber 42 to establish a pressure differential across power wall 38. This additional movement of air valve 64 also causes plunger 102 to be moved leftwardly so that valving surface 128 approaches valve seat 126 to cause a hydraulic fluid flow restriction at control valve 130. This causes an increase in hydraulic pressure in power chamber 132, establishing a pressure differential across power wall 120. The differential pressure across power wall 38 is transmitted to the first output member 90 of the vacuum booster section 18 through piston 50, lever 78, and reaction plate 74. It is also transmitted in this manner to sleeve 90 because reaction plate 74 engages the rear end 92 of that sleeve. Reaction levers 78 pivot at their outer ends on shoulder 80 so that their inner ends engage the forward face 86 of air valve 64, an intermediate point on each of the reaction levers at the edge of reaction plate 74 transmitting a major portion of the boosted force from power wall 38 to the reaction plate 74 and then to the output member 90. The boosted force provided by lever reaction and returned to air valve 64 provides a reaction force to the vehicle operator.

The output member 90 moves leftwardly to transmit boosted force from booster section 18 to power piston 120 and through it to the push rod 136. As pressure builds up in power chamber 132, it is exerted on the power piston 120, urging that piston leftwardly against the force of its spring 146 and the resistance to movement of push rod 136 by master cylinder assembly 22. The power pressure in chamber 132 is also exerted against the outer portion of control valve plunger land 152. It is also transmitted to chamber 180. In chamber 180 the power pressure acts on land 170 of reaction piston 168 to urge the reaction piston leftwardly to maintain engagement of the reaction piston with piston 120. Power pressure also acts over area $A_4$ on a portion of the control valve member forming the rear wall of chamber 180 to urge the control valve member and plunger 102 rightwardly. Exhaust pressure as found in chamber 134 remains on the forward side of reaction piston 168, as well as in annular chamber 156 and the rear portion of bore 158 acting over areas $A_3$ and $A_2$. Exhaust pressure acts over area $A_1$ on the forward end 160 of control valve member and plunger 102 throughout an outer diameter defined by the effective circumference of control valve 130. The control valve member and plunger 102 is therefore almost completely pressure balanced, lowering the force required to move the control valve member valving surface 128 toward valve seat 126, since the back pressure in the hydraulic brake booster section 20 is acting only over a differential area established by the small difference between area $A_3$ and the sum of areas $A_1$ and $A_2$, instead of an entire control valve area as found in U.S. Pat. No. 3,935,709, referred to above.

If, for example, for any reason the vacuum booster section 18 reaches power run-out before the hydraulic booster section 20, the hydraulic booster section may continue to be operated to increase the output force of the assembly. Even if the booster section 18 has no vacuum available at the beginning of actuation, the movement of push rod 60 and air valve 64 to move plunger 102 will cause the hydraulic booster section 20 to be actuated without any more pedal travel loss. Similarly, if hydraulic pressure run-out occurs, or if there is a loss in hydraulic pressure available, the vacuum booster section 18 will transmit its output force through its output member 90 to power piston 120 and then to the output member push rod 136 to the master cylinder.

There is no discernible transition feel under normal operating conditions between the vacuum and hydraulic booster section forces since both act together. The assembly gives a minimum change in feel with various vacuum levels or various hydraulic back pressure levels. Since both hydraulic pressure and vacuum are utilized in normal stops, the system has the advantage that less vacuum requirements are placed on the vehicle engine under such conditions. The same is true of brake power pressure requirements placed on the power steering pump, for example. The assembly retains the very important advantage of having two independent sources of power such that total power source interruption for one source can occur without rendering the power brake assembly inoperative. Such operation would merely require the one active booster section to carry all of the braking load, which is entirely sufficient for normal vehicle stops. This is particularly advantageous as compared to systems utilizing tandem vacuum booster sections or tandem hydraulic booster sections, for example, since the failure of one power source in either instance will result in total loss of brake booster operation.

What is claimed is:

1. A dual power brake booster comprising:
a vacuum suspended first booster section having a first power wall, a first input member controlling power thereto, first and second concentric output members movable relative to each other, said first output member being movable by said first power wall and having reaction means transmitting reaction force to said first input member, said second output member being movable directly by said first input member;
and an open center hydraulic second booster section having a second power wall with a power pressure chamber on one side and an exhaust pressure chamber on the other side, a second input member formed as a part of said second output member and movable to control power to said second power wall, a third input member formed as a part of said first output member and movable therewith to directly move said second power wall by force from said first power wall, a third output member for actuating a master cylinder, and a reaction piston in said second input member sensing hydraulic pressure in said power pressure chamber applied to said second power wall and cooperating with said second input member to transmit reaction force from said second booster section to said first input member through said second input member and said second output member, said second input member including a control valve member and having areas continually exposed to hydraulic pressure downstream of said control valve member, said areas being so opposed as to substantially balance the forces acting thereon which are generated by the hydraulic pressure in said exhaust pressure chamber acting on said opposed areas;

said reaction forces from said first and second booster sections acting on said first input member to provide a combined reaction force indicative of the master cylinder actuation force delivered through said third output member.

2. In an open center hydraulic brake booster having a housing, a power piston reciprocably mounted in said housing and cooperating therewith to define a power chamber and an exhaust chamber, a passage through said piston having an annular valve seat at the power chamber end, a valve member reciprocably mounted to extend into said power chamber and having a valving surface positioned in cooperative valving relation with said valve seat, and means exteriorly of said housing coupled with said valve member for controllably moving said valve member to control said booster by controlling hydraulic fluid flow through said piston passage, the improvement comprising:

a sleeve defining a bore and extending from said power chamber exteriorly of said housing and sealingly and reciprocably receiving said valve member therethrough, said sleeve having a reduced diameter bore section at the end thereof opposite said power chamber and said valve member having a reduced diameter end extending therethrough in sealing relation and coupled with said means;

said valve member having its other end formed with a stepped recess bore having a larger diameter portion and a smaller diameter portion, the open end thereof opening into fluid communication with said exhaust chamber through said piston passage;

said valve member further having a first cross passage intersecting the larger diameter portion of said recessed bore and a second cross passage intersecting the smaller diameter portion of said recessed bore, and a seal positioned axially between said cross passages and sealingly engaging the wall of said sleeve bore;

and a reaction piston having a larger diameter land sealingly received in the larger diameter portion of said recessed bore, a smaller diameter land sealingly received in the smaller diameter portion of said recessed bore, an end extending axially beyond said valve member and engaging said power piston, an axial bore in fluid communication with said exhaust chamber through said piston passage and with said second cross passage which is in fluid communication with an annular chamber defined by said sleeve reduced diameter bore section at one end and said valve member seal between said cross passages at the other end;

said reaction piston and said valve member cooperating to define an effective reaction chamber the effective area of which is defined by the difference in diameters of said larger and smaller diameter portions of said valve member recessed bore;

said valve member being substantially balanced by exhaust chamber pressure being received in said second cross passage and said annular chamber and at said open end.

* * * * *